United States Patent [19]
Pouille et al.

[11] Patent Number: 5,851,557
[45] Date of Patent: Dec. 22, 1998

[54] RIGID-CORE MOLD FOR ANNULAR TREADS INTENDED, IN PARTICULAR, FOR THE RECAPPING OF TIRES

[75] Inventors: Guy Pouille, Clermont-Ferrand; Bernard Ravel, Nohanent, both of France

[73] Assignee: Compagnie Generale des Establissements Michelin - Michelin & Cie, Clermont-Ferrand, France

[21] Appl. No.: 769,715

[22] Filed: Dec. 18, 1996

[30] Foreign Application Priority Data

Dec. 19, 1995 [FR] France .................................. 95 15892

[51] Int. Cl.$^6$ ............................................ B29C 35/02
[52] U.S. Cl. .............................. 425/46; 425/28.1; 425/35
[58] Field of Search .................. 425/15, 16, 17, 425/20, 25, 28.1, 35, 46, 47, 49, 394, 577; 264/326

[56] References Cited

U.S. PATENT DOCUMENTS

| | | | |
|---|---|---|---|
| 3,974,018 | 8/1976 | Arimura et al. | 425/46 |
| 4,181,482 | 1/1980 | Grawey et al. | 425/46 |
| 4,448,620 | 5/1984 | Fink | 425/46 |
| 4,895,692 | 1/1990 | Laurent et al. | 264/326 |
| 5,066,448 | 11/1991 | Chlebina et al. | 264/334 |
| 5,269,669 | 12/1993 | Ladouce | 425/47 |

FOREIGN PATENT DOCUMENTS 2306069  10/1976  France .

*Primary Examiner*—James P. Mackey
*Attorney, Agent, or Firm*—Baker & Botts

[57] ABSTRACT

An improved mold (1) for the molding and vulcanizing of annular treads intended, in particular, for the recapping of tires, which includes at least one rigid core (3) defining the inner surface of the tread and a collar (2) divided into sectors (21) which are movable radially between an open position and a closed position of the collar (2) for the molding of the outside of the tread, characterized by the fact that the core (3) bears movable annular elements (5) for the tight connection of the core (3) to the sectors (21) whatever the position of the latter between the closed position of the collar (2) and a slightly apart position of the sectors (21), and that the sectors (21), the core (3), and the annular element (5) define the molding space of the tread.

15 Claims, 3 Drawing Sheets

RIGID-CORE MOLD FOR ANNULAR TREADS INTENDED, IN PARTICULAR, FOR THE RECAPPING OF TIRES

BACKGROUND OF THE INVENTION

The present invention relates to an improved rigid-core mold for the molding and vulcanizing of annular treads intended, in particular, for the recapping of tires.

More particularly, the invention relates to an improved mold comprising at least a rigid core defining the inner surface of the tread and a collar divided into sectors which are movable radially between an open position and a closed position of said collar which assures the outer molding of said tread.

The well-known advantage of using rigid-core molds resides in the high quality of the geometrical shapes of the molded products which they make it possible to obtain.

U.S. Pat. No. 5,066,448 describes a mold of this type for treads which comprises a rigid core and a collar divided into radially movable sectors, and in which the rigid core and the collar define the molding space of the tread. In order to assure a sufficient, uniform pressure on the tread, it is necessary to adjust said space to the volume of the tread. However, the molding phase generally commences before the complete closing of the mold, which results in the risk of the rubber flowing from the tread between the sectors and the core. The "imprisoned" zones of rubber between the sectors and the core constitute, upon removal from the mold, defects which are currently known as "flashes" which have to be removed manually and which represent a not insignificant loss of material.

Furthermore, in a completely rigid mold the volumetric expansion of the tread upon vulcanization may cause a considerable increase of the pressure and extensive damage to certain parts of the mold.

One solution consists in effecting a control of pressure which makes it possible, when a predetermined threshold has been reached, to allow the sectors of the collar to move apart slightly, for instance by a decrease in the outer pressure exerted on the sectors, and thus to effect a radial extension of the molding space. However, upon such an extension, rubber which has come from the tread may flow out at the interface of the rigid core and the sectors, resulting in the appearance of flashes. Furthermore, this solution does not solve the problems of flashes which are created upon the closing of the mold.

SUMMARY OF THE INVENTION

The invention is directed at overcoming the above difficulties and, in particular, at making it possible to obtain treads without flashes between the core and the sectors, whatever the origin thereof, i.e. whether coming from the molding upon the closing of the mold or from the vulcanization.

In the following, by way of analogy with a tire, the region of the core located between its crown and one of its sidewalls will be referred to as the "shoulder" of the core.

In accordance with the invention, the core bears movable means for the tight connection of said core to the sectors whatever the position of the latter between the closed position of the collar and a slightly apart position of the sectors, and said sectors, the core, and the connecting means define the molding space of the tread.

In accordance with one feature of the invention, for use with a conventional core having a crown, sidewalls and shoulders, the connecting means comprise for each shoulder an annular element which defines the outer surface of said shoulder and each annular element comprises a first peripheral edge, mounted in contact with the crown of said core, and a second peripheral edge movable between two given positions, which assures the connection between the core and the sectors. This connection is advantageously effected by a tight sliding contact.

The second peripheral edge of each annular element is preferably movable, by elastic deformation of said annular element, between an initial position and a compressed position.

The object of the invention is, therefore, an improved mold which provides a tight connection of the sectors of the collar and the core by sliding contact and due to the elastic deformation of movable means borne by the core, from the very start of the molding, that is to say before the complete closing of the mold and when a slight separation of the sectors is effected at the time of vulcanization.

Other characteristics and advantages of the invention will become evident from the description of an embodiment of an improved mold in accordance with the invention, read with reference to the drawings.

DESCRIPTION OF PREFERRED EMBODIMENTS

Figure 1:
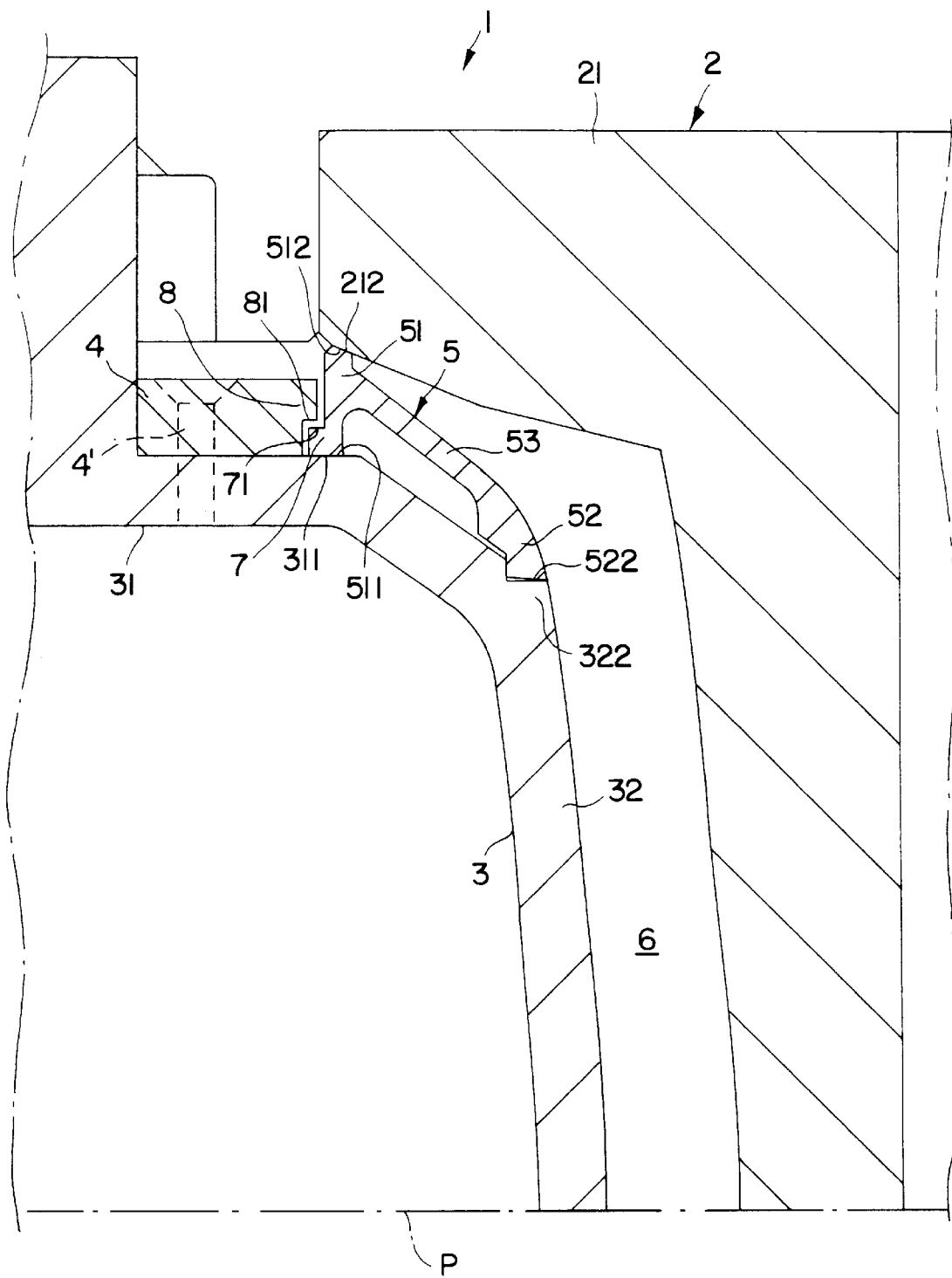
FIG. 1 is a partial meridian section through the mold in its initial closed position.
Figure 2:
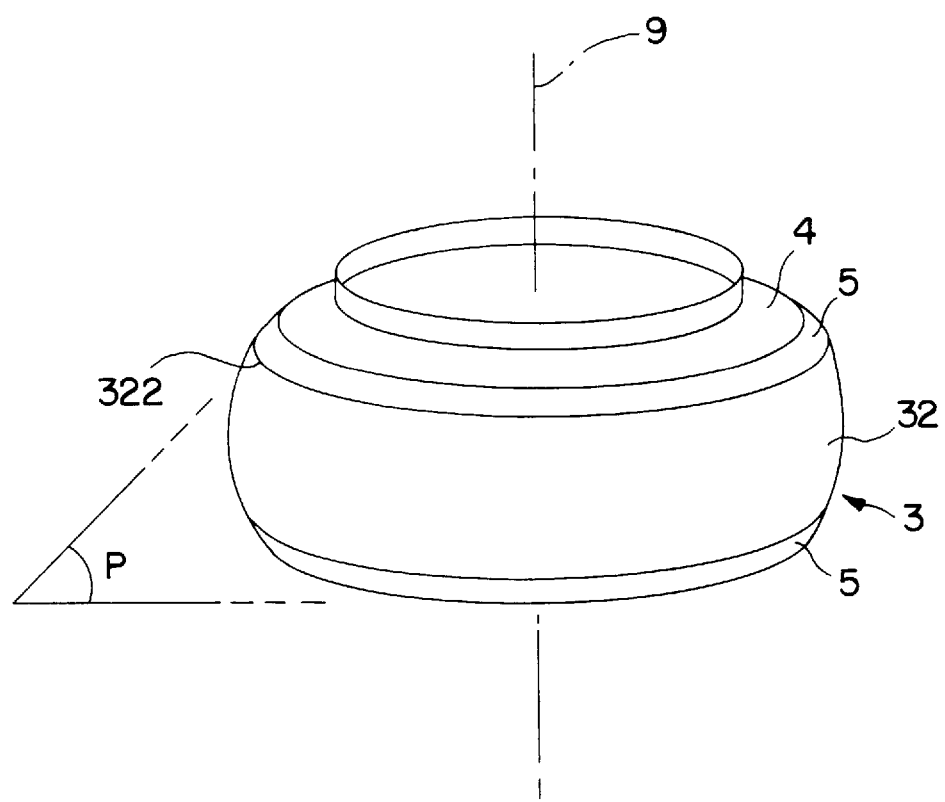
FIG. 2 is a perspective view of the core of the mold shown in FIG. 1.

Referring to FIGS. 1 and 2, the mold 1 comprises, at least:

- a collar 2 divided into sectors 21 which are movable radially between a closed position and an open position of the collar 2 which assures the outer molding of the tread;
- a rigid metallic core 3 of quasi-toroidal shape defining the inner surface of said tread; this core 3 has sidewalls 31, a crown 32 and shoulders which bear the means for connecting said core 3 to the sectors 21 of the collar 2, said means for each shoulder being formed by a separate annular element 5 capable of undergoing elastic deformation and defining the outer face of said shoulder;
- a ring 4 for the fastening each element 5 on the core 3, the ring being coaxial with the element 5 and fastened rigidly on each sidewall 31 by a conventional fastening device, such as screws 4'.

The cavity 6, defined by the crown 32 of the core 3, the elements 5 and the collar 2, define the molding space of the tread.

The mold 1 is symmetrical with respect to its horizontal median plane P, shown in FIG. 2, and only the part of the mold 1 above this plane will be described herein.

The element 5, which can be developed in the form of a ring, comprises a first peripheral edge 51 at the level of the sidewall 31 of the core 3, and a second peripheral edge 52, limited by a flat face 522 parallel to the plane P of the mold 1, in contact with the crown 32. The two edges 51 and 52 are connected by a relatively thin wall 53 having an outer shape which is curved or convex along a profile defining the outer surface of the core 3.

The element 5 is mounted on the core 3 as follows:
the edge 52 is mounted radially on a shoulder 322 of the crown 32 in such a manner that there is a continuity of the outer surfaces of the shoulder 322 and of the edge 52;

the edge 51 has a cylindrical shoulder 7 formed with a seating surface 71 parallel to the plane P which is engageable with an adjacent surface 81 of a shoulder 8 formed on the outer surface of revolution of the ring 4 and extending around the entire circumference of the ring.

The element 5 is mounted, prestressed, on the core 3 by means of the ring 4. More specifically, the edge 52 is placed against the shoulder 322 of the crown 32, and the element 5 is compressed via its edge 51 towards the sidewall 31 of the core 3 and held in this position by the mounting of the ring 4, the shoulder 8 of which limits the axial displacement of the shoulder 7 of said edge 51. The prestress makes it possible to lock the edge 52 against the shoulder 322 of the core 3. The ring 4 thus holds the element 5 in its initial prestressed position on the core 3.

The edge 51 has two surfaces, an inner surface 511 which contacts a surface 311 on the outside of the sidewall 31 and an outer surface 512 which contacts a surface 212 on the inside of the sectors 21.

The surfaces 512 and 212 are frustoconical in contradistinction to the surfaces 511 and 311 which are substantially perpendicular to the vertical axis 9 of the mold 1. Furthermore, the surfaces 512 and 212 produce a tight sliding contact, so that they assure a tight continuous connection when the sectors move from the closed position of the collar 2 to a slightly separated position, and vice versa.

The edge 52 remains fixed with respect to the shoulder 322, while the edge 51, by the elastic deformation of the element 5, is movable between an initial prestressed position described above and a so-called "compressed" position in which, due to the element 5 undergoing additional compression, the surfaces 511 and 311 are placed in contact and the shoulders 7 and 8 are separated. This additional compression is effected by the pressure of the sectors 21 on the element 5 via their surfaces 212 and 512, respectively.

The adjustment of the mold 1 is effected in such a manner that the initial position of the edge 51 corresponds to a position in which the sectors 21 are non-abutting but close together to be contiguous to each other and that the position of complete closure of the collar 2 imposes upon the element 5 a compression which brings its edge 51 into contact with the core 3.

It should be pointed out that the displacement of the edge 51 can be of very slight amplitude, its axial displacement being on the order of a millimeter.

In order to obtain such an elastic deformation, one can select, as the constituent material of the element 5, a metal alloy, such as an alloy having a base of chromium and molybdenum, which is capable of providing a good compromise between the elasticity necessary for the displacement of the edge 51 and sufficient rigidity for the maintaining in position of the edge 52. Such an alloy, furthermore, makes it possible to assure good thermal conduction and to resist wear due to rubbing of the surfaces 512 and 212. For this purpose, it may be useful to subject the surface 212, which is generally a metal surface, to a surface treatment.

In order to improve the elasticity of the element 5 due to the selection of the material, the wall 53 of said element defines with the core 3 an empty cavity 10. The thickness of the wall 53 is determined so as to permit by flexure a certain radial displacement of the edge 51 with respect to the edge 52.

In the following, the functioning of the mold 1 will be described on basis of the functioning of the upper part of said mold above the plane P.

Before the molding of the tread, the element 5 being prestressed on the core 3, the shoulder 7 of the edge 51 is resting on the shoulder 8 of the ring 4, while the surface 511 is not in contact with the surface 311 of the sidewall 31.

The closing of the mold 1 is effected by bringing the sectors 21 together. In order to obtain the movements of the sectors 21 of the collar 2, any suitable means such as mechanical, hydraulic or pneumatic jacks are used in conventional manner.

The contact of the surface 512 of the edge 51 with the surface 212 of the sectors 21 takes place before the latter are contiguous to each other. Thus, the tight connection between the sectors 21 and the core 3 is obtained before the molding phase has commenced. Therefore, from the very start of the latter, the tight connection prevents a possible flowing of rubber into these surfaces.

The sectors 21 then subject the element 5 to an additional compression in order to reach their closed position, shown in FIG. 1. The edge 51 then passes into compressed position: the shoulders 7 and 8 are no longer in contact, but the surfaces 511 and 311 are in contact.

One then proceeds with an increase in temperature up to the vulcanization temperature, which may be on the order of 160° C. The volume of rubber in the cavity 6 corresponds substantially to the volume of said cavity, so that the expansion of the rubber results in a progressive increase of the internal pressure within the cavity 6.

Beyond a given pressure threshold, a slight moving apart of the sectors 21 corresponding at most to the initial position of the edge 51, is permitted by any suitable device, such as described, for example, in French patent application No. 95/11364, filed on Sep. 26, 1995, in order to continue assuring the core-sectors connection and effecting a radial extension of the volume of the cavity 6.

Figure 3:
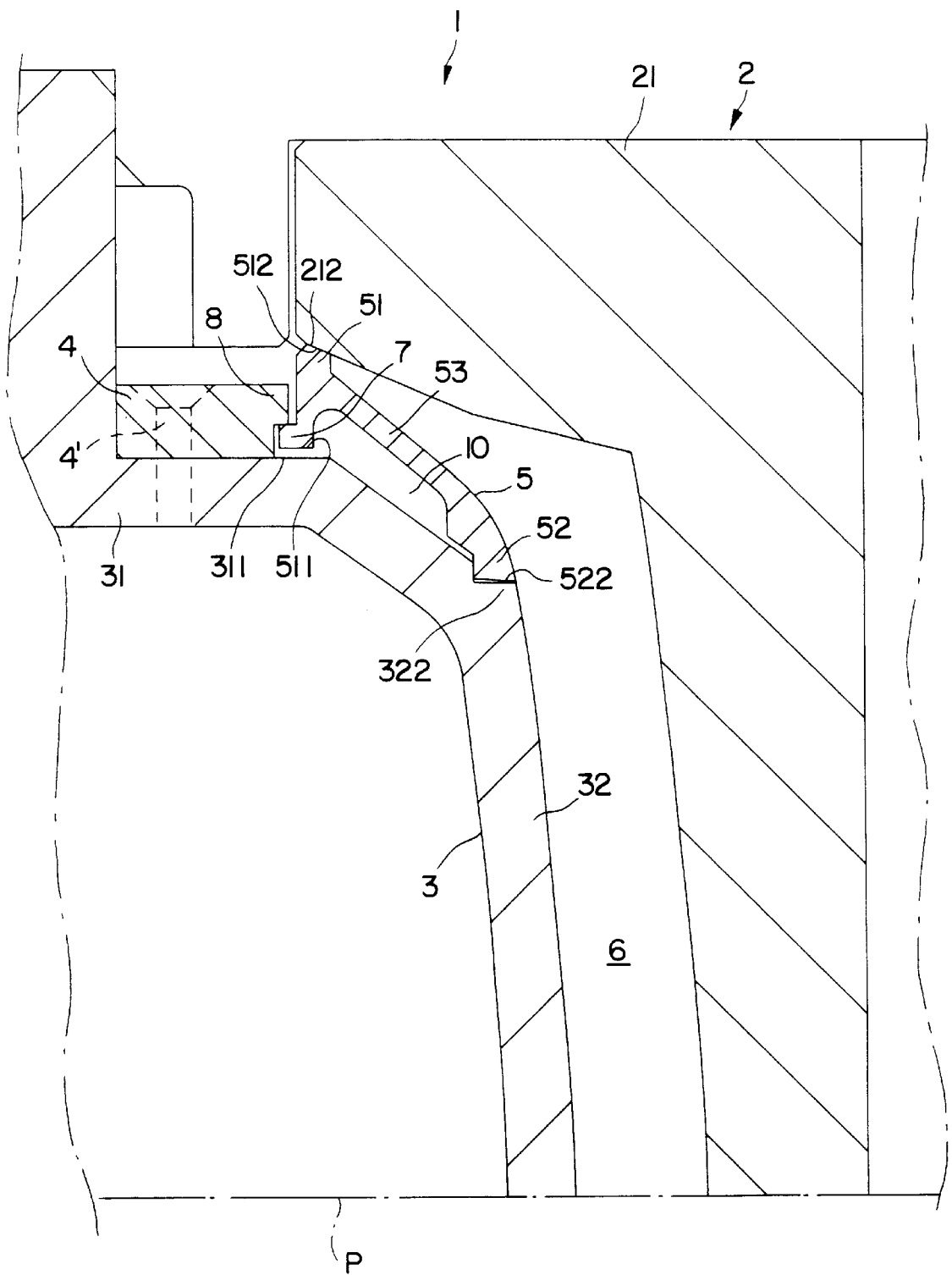
FIG. 3 is a partial section through the mold during vulcanization.

This movement apart eliminates, in whole or in part, the additional compression imparted to the element 5. The latter, due to its elasticity, then returns to its initial position and therefore continues to be in contact with the sectors 21, the surfaces 212 of the sectors and 512 of the edge 51 still forming a tight connection by sliding contact, as shown in FIG. 3. The effect is as though the element 5 followed the movement of retraction of the sectors 21.

The radial extension effected in order to increase the volume of the cavity 6 does not cause the movement apart at the level of the core-sector interface. There is, therefore, no possible flow of the rubber at the level of this interface. Thus, the tread obtained does not have any flashes in the zone between the core 3 and the sectors 21.

We claim:

1. A mold for the molding and vulcanizing of annular treads, comprising at least one rigid core defining the inner surface of the tread, a collar divided into sectors which are movable radially between an open position and a closed position of said collar for molding of the outer surface of the tread, and axially movable connecting means on the core for providing a tight connection between said core and the sectors whatever the position of the sectors between said closed position of the collar and a slightly apart position of the sectors, the sectors, the core, and the connecting means defining the mold cavity for the tread.

2. A mold according to claim 1, in which the core includes a crown, sidewalls and shoulders, the shoulders being intermediate the crown and the sidewalls, and in which the connecting means comprise, for each shoulder, an annular element defining the outer molding surface of the shoulder, and in which each annular element includes a first peripheral edge mounted in contact with the crown of said core and a second peripheral edge movable between two positions and assuring the connection between the core and the sectors.

3. A mold according to claim 2, in which the second peripheral edge of each annular element is movable by elastic deformation of said annular element between an initial position and a compressed position.

4. A mold according to claim 2, in which the connection between the core and the sectors is effected by tight sliding contact of the connecting means and the sectors between the two positions of the second peripheral edge.

5. A mold according to claim 2, including a coaxial fastening ring mounted on each said sidewall for holding the corresponding annular element axially on the core.

6. A mold according to claim 5, including a first cylindrical shoulder on the annular element and a second cylindrical shoulder on the fastening ring which are engageable with each other in at least one of the two said positions of the second peripheral edge.

7. A mold according to claim 5, in which each annular element is mounted prestressed on the core by a corresponding fastening ring.

8. A mold according to claim 2, in which the first peripheral edge of each annular element is mounted to engage a shoulder of the crown of the core, and the outer surface of the first peripheral edge and said shoulder of the crown form a continuous outer molding surface.

9. A mold according to claim 2, in which the second peripheral edge of each annular element has two opposite surfaces, an outer surface and an inner surface, for contact, respectively, with a surface on the inside of the collar and with a surface on the outside of the corresponding sidewall of the core.

10. A mold according to claim 9, in which the outer contact surface of the annular element and the surface on the inside of the collar are frustoconical and produce a tight sliding contact.

11. A mold according to claim 2, in which there is an axial displacement of the movable peripheral edge of the annular element on the order of a millimeter in the movement between the said two positions of the second peripheral edge.

12. A mold according to claim 2, in which the inner surface of each annular element defines a cavity with the core between the two peripheral edges of the annular element.

13. A mold according to claim 1, in which the connecting means are formed of a metallic material.

14. A mold for molding and vulcanizing tire treads comprising a rigid core defining an inner surface of the tread, a collar divided into sectors which are movable between an open position and a closed position of said collar for the molding of the tread and at least one annular element mounted on the core for preventing leakage of rubber from the mold between the mold sectors and the core and having an outer molding surface, said annular element having a fixed peripheral edge which remains seated on the core and a peripheral edge which is movable between spaced apart inner and outer surfaces of the core and which in the closed position of the collar is moved by the sectors inwardly against the inner surface of the core and in a retracted position of the sectors is movable against the outer surface of the core, the annular element when engaged with either the inner or outer spaced apart surfaces preventing a leakage of rubber between the mold sectors and the core.

15. A mold as set forth in claim 14 including an annular ring mounted on the core and providing the outer of the two spaced apart surfaces.

* * * * *